Jan. 28, 1958 — A. E. PASCHAL — 2,821,278
EAR AND SHELLED CORN HANDLING DEVICE
Filed April 25, 1956 — 2 Sheets-Sheet 1

Inventor
Arthur E. Paschal
by M. Talbert Dick
Attorney

Witness
Edward P. Seeley

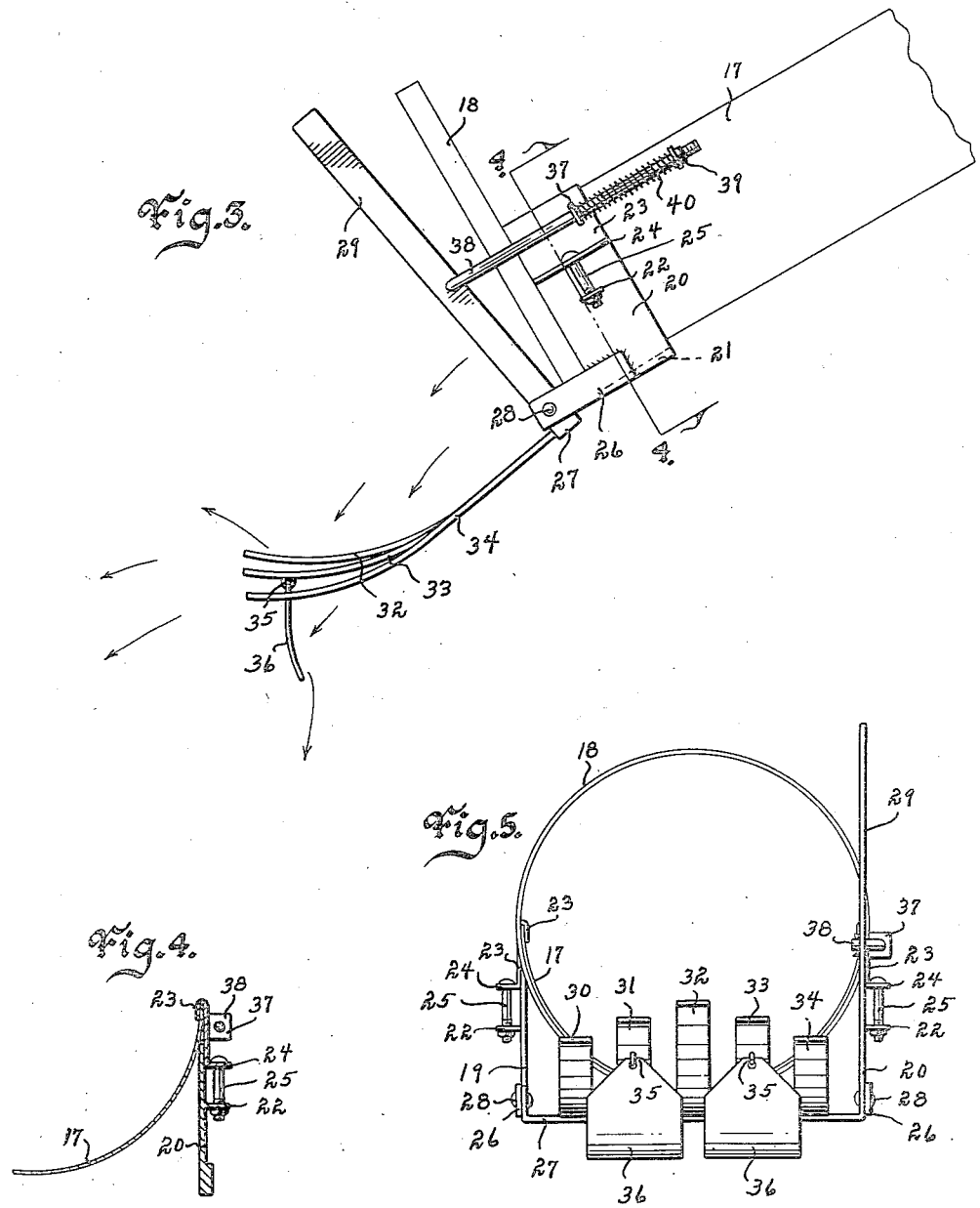

United States Patent Office 2,821,278
Patented Jan. 28, 1958

2,821,278

EAR AND SHELLED CORN HANDLING DEVICE

Arthur E. Paschal, Vinton, Iowa

Application April 25, 1956, Serial No. 580,632

5 Claims. (Cl. 193—2)

This invention relates to equipment for directing, retarding and distributing both shelled and ear corn into storage bins, cribs, and like, and is an improvement on the corn handling means disclosed in my United States Letters Patent No. 2,717,068, issued September 6, 1955.

Most corn after harvesting is placed in a corn crib for storage and drying. These cribs usually have sides that are formed or spaced apart slats to permit ample air passage while retaining the ears of corn. The most common type crib has a solid roof, a longitudinal driveway through it, and often a grain bin above the driveway. The driveway also acts as an airway through the center of the building. To fill each side of the building with ears of corn, the common practice is to elevate the corn by mechanical means to the top of the building and then by use of a chute, direct it to either side over the top of the granary above the driveway. While this does eventually fill the crib, several objectionable factors occur. First, the corn is dropped and discharged downwardly and laterally with such force that it strikes the inner side of the outside wall. This is most damaging to the wall and necessitates its frequent repair or replacement. Furthermore, considerable corn is objectionably shelled from the ears striking the wall of the crib. Even if the storage space is an enclosed housing or bin, the material is objectionably packed and unevenly distributed. This is especially true of shelled grain, which has a tendency to fall into certain locales and the more bulky ears into different areas. This localizing of shelled grain to the ear corn interferes with proper drying, aeration, and weight distribution. While the device disclosed in my heretofore mentioned patent did distribute and retard the corn ears, it in fact separated the ears from the loose kernels and, therefore, increased the objectional uneven distribution of the loose shelled grain.

Therefore, one of the principal objects of my invention is to provide a corn handling means that evenly comingles the loose shelled grain and the ears of corn thereby increasing ventilation throughout the entire stored mass and thus eliminating spoilage.

A further object of this invention is to provide a corn handling device that incorporates an adjustable yielding corn directing means.

A further object of my invention is to provide an ear corn distributing means that will slow down the speed of travel of the corn at moment of discharge into a crib or like.

A still further object of my invention is to provide an ear corn handling means for cribs or like that is capable of directing the corn into various points within the crib or like.

A still further object of this invention is to provide a means for adjustably controlling the speed of travel of the corn being discharged into a storage space.

A still further object of my invention is to provide a corn discharge unit that greatly reduces the amount of shelled corn herebefore experienced in the process of filling a crib with ear corn.

Still further objects of my invention are to provide a corn discharge control unit that is economical in manufacture and durable in use.

These and other objects will be apparent to those skilled in the art.

My invention consists in the construction, arrangement, and combination of the various parts of the device, whereby the objects contemplated are attained as hereinafter more fully set forth, specifically pointed out in my claims, and illustrated in the accompanying drawings, in which:

Fig. 3 is a side view of the device in use, Fig. 4 is a cross sectional view of my corn handling means taken on line 4—4 of Fig. 3, and Fig. 5 is a front end view.

Figure 1:
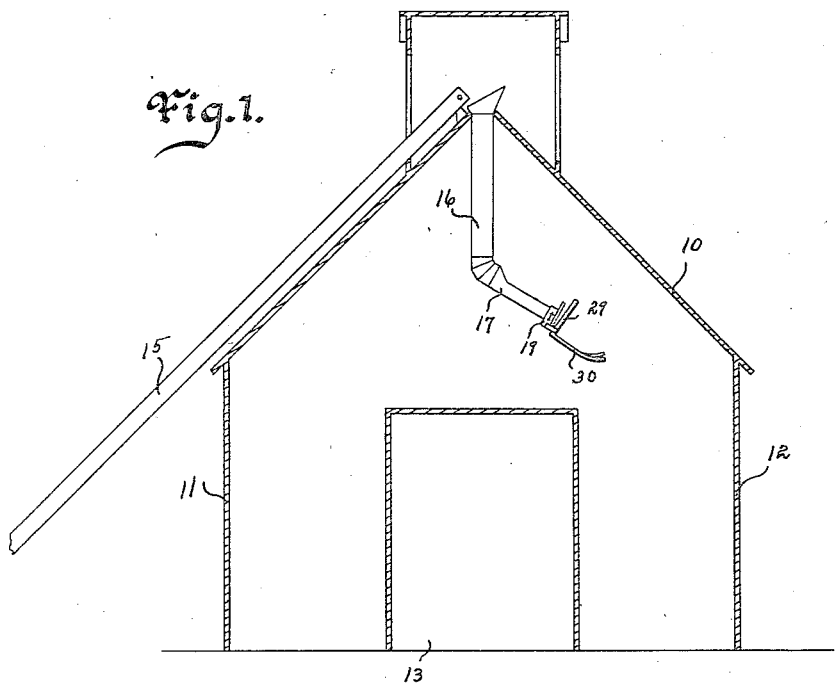
Fig. 1 is an end sectional view of a corn crib with my device in use therewith.
Figure 2:
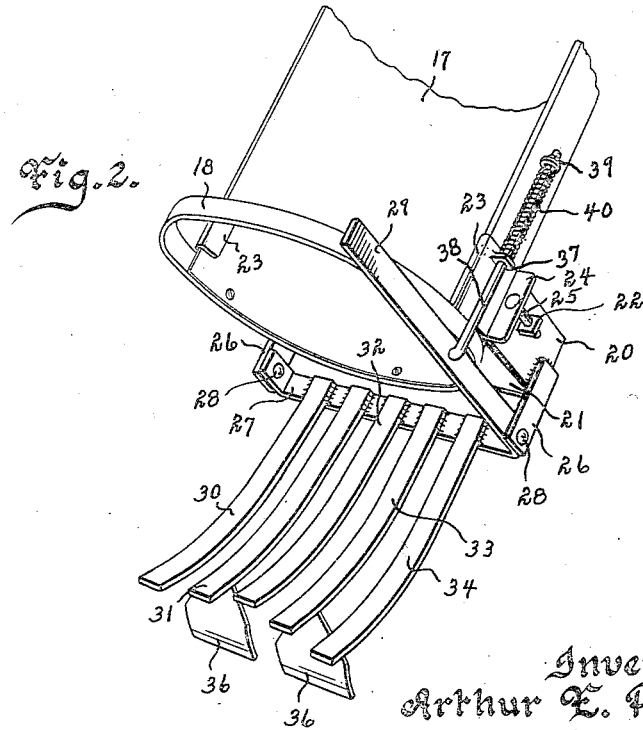
Fig. 2 is an enlarged perspective view of my device, and more fully illustrates its construction.

In these drawings I have used the numeral 10 to designate an ordinary corn crib having the sides 11 and 12, and the drive-through 13. There are several methods of elevating the ear corn to the top of the building. Usually a powered elevator 15 is used, and the pipe chute 16 is employed to direct the corn over and to either side of the grain bin 14. As before noted, without my device the corn shoots out of the chute 16, outwardly and downwardly to strike the inside of the outer wall of the crib. I will now describe my device in detail. It may be resting on top of the areaway or hung free on the outer end portion of the half round chute 17 on the lower end of the pipe 16, as shown in Fig. 1. The numeral 18 designates a band ring embracing the end of trough chute 17. My device has two vertical plates 19 and 20 adapted to extend at each side of the chute 17, respectively. A brace bar 21 extends between these two plates and below the chute 17, as shown in Fig. 2. On the outer side of each plate is an ear 22. Slidably mounted on the outer side of each plate is a hook member 23 having its upper hook end detachably hooking over the adjacent top rim of the chute 17 and its lower end bent outwardly to form a flange 24. The numeral 25 designates a bolt extending through each flange 24 and ear 22, as shown in Fig. 5. By tightening the bolts 25, the hook member will be moved downwardly thereby tightening and securing my device onto the outer end portion of the chute 17. Extending forwardly from the lower end portion of each plate is a bearing arm 26. The numeral 27 designates a bar extending between the bearing arms 26 and rotatably secured thereto by rivets 28, as shown in Fig. 2. One end of this bar 27 is bent to extend upwardly to form a lever arm 29. Extending forwardly from the bar 27 are the elongated flat spaced apart figures 30, 31, 32, 33 and 34. All these fingers are curved upwardly as they extend forwardly, but the center located ones are more curved than the outer ones, as shown in Fig. 5. This construction directs the corn to each side as well as forwardly. On the outer bottom of each of the two fingers 31 and 33 is an eye 35. The numeral 36 designates a spade loosely suspended at its center top to each of the eyes 35. These spades may swing forwardly or rearwardly and their vertical length is curved to extend normally downwardly and rearwardly, as shown in Fig. 3. The combined width of these two baffle spades is such as to cover the longitudinal space planes between the lower portions of the fingers, as shown in Fig. 5. The upper end portions of each of these members 36 are inwardly tapered. The numeral 37 designates a vertical ear on the hook member to the rear of the lever arm 29. The numeral 38 designates a rod pivoted to the lever arm 29 and extending rearwardly slidably through the ear 37. The numeral 39 designates a nut threaded onto the rear end portion of the rod. The numeral 40 designates a coil spring embracing the rod 38 having one end contacted by the nut 39 and its other end contacted by the ear 37. Thus, the broad flat fingers 30, 31, 32, 33 and 34 are yieldingly held to extend forwardly. This yielding force is adjustable by the nut 39 to compensate for different weight factors and conditions. By the fingers being yieldable and thus shock absorbing the ear corn contacting them will not be damaged nor kernels shelled therefrom. Also in case of a congestion of ears, or too great a weight load, the fingers move downwardly thereby automatically clearing themselves. Also by adjusting the spring tension, the angle of the fingers may be controlled to direct the corn further from or closer to the end of the chute. The arm 29 provides an excellent manual lever to test the spring tension.

To install my device the hook members 23 are placed over the top edges of the chute and the bolts 25 tightened. To remove the device it is only necessary to loosen these bolts, unhook the members 23, and slide the device from the chute 17.

In use, the corn will pass down the chute and onto and from the flat fingers. Some ears will go far, some shorter distances, and some will be directed to each side because of the increased elevation of the centermost fingers. However, most of the ears of corn will move longitudinally, due to the elongated fingers, thereby causing them to stack parallel with each other in the bin. Thus, more corn can be placed in a given bin area. The flat top surface of the fingers is most important. First, there is less objectionable shelling of the grain from the ears. More important is that grain previously shelled before reaching my device, will ride forwardly on the flat surfaces of the fingers and thereby be evenly sprayed in all directions. Some kernels striking the spades 36 will even be deflected rearwardly and downwardly. This scattering of the loose kernels throughout the ears of corn prevents stacking of solid grain in one locality, where it might well spoil and in any event would prevent uniform ventilation through the stored product. In my previous experiments with rod fingers, the kernels could not ride or slide thereon, and would therefore drop directly downwardly from the bar 27 and pack in one locality in the bin. My flat elongated fingers solved this problem as herebefore explained. Another important feature of my device is the yielding adjustment of the bar 27 against rotation. Not only will the fingers "dump" an over maximum load automatically but this yieldable means of holding the fingers in proper position acts as a shock absorber to the ears striking the fingers.

While I have described my device as adapted to the handling of corn, obviously it may be used successfully in the handling of other farm crops.

Some changes may be made in the construction and arrangement of my ear and shelled corn handling device without departing from the real spirit and purpose of my invention, and it is my intention to cover by my claims, any modified forms of structure or use of mechanical equivalents which may be reasonably included within their scope.

I claim:

1. In a farm product handling means, a frame, a means for securing said frame to a conduit, a horizontal bar rotatably secured to said frame, a means for controlling the rotation of said bar, a plurality of spaced apart flat fingers extending forwardly from said bar, and a flat member suspended from the bottom of at least one of said fingers.

2. In a farm product handling means, a frame, a means for securing said frame to a conduit, a horizontal bar rotatably secured to said frame, a means for controlling the rotation of said bar, a plurality of spaced apart flat fingers extending forwardly from said bar, and a plurality of downwardly extending flat spade members loosely suspended from said fingers.

3. In a farm product handling means, a frame, a means for securing said frame to a conduit, a horizontal bar rotatably secured to said frame, a means for controlling the rotation of said bar, a plurality of spaced apart flat fingers extending forwardly from said bar, and a plurality of downwardly extending flat spade members loosely suspended from said fingers having their widths extending transversely of the longitudinal lengths of said fingers.

4. In a farm product handling means, a frame, a means for securing said frame to a conduit, a horizontal bar rotatably secured to said frame, a means for controlling the rotation of said bar, a plurality of spaced apart flat fingers extending forwardly from said bar in curved upward planes, and a plurality of downwardly extending flat spade members loosely suspended from said fingers having their widths extending transversely of the longitudinal lengths of said fingers and their vertical lengths curved to extend downwardly and rearwardly.

5. In a farm product handling means, a frame, a means for securing said frame to a conduit, a horizontal bar rotatably secured to said frame, an arm extending from said bar, a bearing ear on said frame, a rod hinged at one end to said arm and having its center length slidably extending through said ear, a nut threaded onto the free end of said rod, a coil spring embracing said rod having one end bearing on said ear and its other end bearing on said nut, and a plurality of spaced apart flat fingers extending forwardly from said bar.

References Cited in the file of this patent

UNITED STATES PATENTS

| | | |
|---|---|---|
| 1,040,392 | Ogle et al. | Oct. 8, 1912 |
| 1,133,692 | Adams | Mar. 30, 1915 |
| 1,135,620 | Rhodes | Apr. 13, 1915 |
| 1,247,480 | Adams | Nov. 20, 1917 |
| 2,717,068 | Paschal | Sept. 6, 1955 |